United States Patent
Dong et al.

(10) Patent No.: US 9,894,500 B2
(45) Date of Patent: Feb. 13, 2018

(54) STATUS INFORMATION UPDATE METHOD AND MOBILE TERMINAL

(71) Applicant: HUAWEI TECHNOLOGIES CO., LTD., Shenzhen (CN)

(72) Inventors: Mingjie Dong, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/196,247

(22) Filed: Jun. 29, 2016

(65) Prior Publication Data

US 2016/0309309 A1    Oct. 20, 2016

Related U.S. Application Data

(63) Continuation of application No. PCT/CN2014/094756, filed on Dec. 24, 2014.

(30) Foreign Application Priority Data

Dec. 30, 2013   (CN) .......................... 2013 1 0744350

(51) Int. Cl.
*H04M 3/00* (2006.01)
*H04W 4/14* (2009.01)
(Continued)

(52) U.S. Cl.
CPC .......... *H04W 4/14* (2013.01); *H04M 3/42144* (2013.01); *H04W 4/12* (2013.01); *H04W 8/24* (2013.01)

(58) Field of Classification Search
CPC ......... H04W 8/245; H04W 4/14; H04W 4/12; H04M 1/72533; H04L 29/06
(Continued)

(56) References Cited

U.S. PATENT DOCUMENTS 8,401,004 B2 * 3/2013 Song .................. H04W 76/025
                                                          370/352
9,167,415 B2 * 10/2015 Nystrom ......... H04M 1/274516
(Continued)

FOREIGN PATENT DOCUMENTS

CN         101064747 A       10/2007
CN         101873557 A       10/2010
(Continued)

OTHER PUBLICATIONS

International Search Report and Written Opinion dated Mar. 25, 2015 in corresponding International Patent Application No. PCT/CN2014/094756.
(Continued)

*Primary Examiner* — Danh Le
(74) *Attorney, Agent, or Firm* — Staas & Halsey LLP

(57) ABSTRACT

Embodiments of the present invention provide a status information update method, including: receiving, by a first mobile terminal, a status update message sent by a second mobile terminal, where the status update message is used to indicate a change of a status of the second mobile terminal; and updating, by the first mobile terminal according to the status update message, status information of the second mobile terminal that is stored in the first mobile terminal. According to the embodiments of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

22 Claims, 6 Drawing Sheets

(51) Int. Cl.
  *H04W 4/12* (2009.01)
  *H04M 3/42* (2006.01)
  *H04W 8/24* (2009.01)

(58) Field of Classification Search
  USPC ............... 455/466, 418, 412.1, 420; 709/209
  See application file for complete search history.

(56) References Cited

U.S. PATENT DOCUMENTS

| | | | | |
|---|---|---|---|---|
| 2009/0122769 | A1* | 5/2009 | Hirano | H04W 64/006 370/338 |
| 2010/0093246 | A1* | 4/2010 | Honda | H01T 21/02 445/3 |
| 2010/0120453 | A1 | 5/2010 | Tamchina et al. | |
| 2010/0220697 | A1* | 9/2010 | Liu | H04M 1/2535 370/338 |
| 2011/0171934 | A1* | 7/2011 | Lim | H04L 51/043 455/412.1 |
| 2011/0258159 | A1* | 10/2011 | Mitchell | H04M 1/274516 707/613 |
| 2012/0210008 | A1* | 8/2012 | Hsieh | H04L 61/1535 709/227 |
| 2013/0217364 | A1 | 8/2013 | Varoglu et al. | |
| 2013/0290440 | A1* | 10/2013 | Pratt | H04L 51/38 709/206 |
| 2014/0289347 | A1* | 9/2014 | Virani | H04L 51/046 709/206 |
| 2015/0362250 | A1* | 12/2015 | Wang | F25J 3/0209 62/611 |
| 2016/0173680 | A1* | 6/2016 | Yong | H04W 4/008 455/466 |
| 2016/0259761 | A1* | 9/2016 | Laborczfalvi | G06F 17/2235 |

FOREIGN PATENT DOCUMENTS

| | | |
|---|---|---|
| CN | 103037195 A | 4/2013 |
| CN | 103095907 A | 5/2013 |
| CN | 103139761 A | 6/2013 |
| CN | 103747414 A | 4/2014 |
| EP | 2 239 986 A1 | 10/2010 |
| EP | 2 288 122 A1 | 2/2011 |

OTHER PUBLICATIONS

Extended European Search Report dated Nov. 14, 2016 in corresponding European Patent Application No. 14876443.4.
International Search Report dated Mar. 25, 2015, in corresponding International Application No. PCT/CN2014/094756.
European Office Action dated Oct. 27, 2017 in corresponding European Patent Application No. 14 876 443.4, 5 pages.

* cited by examiner

STATUS INFORMATION UPDATE METHOD AND MOBILE TERMINAL

CROSS-REFERENCE TO RELATED APPLICATIONS

This application is a continuation of International Application No. PCT/CN2014/094756, filed on Dec. 24, 2014, which claims priority to Chinese Patent Application No. 201310744350.4, filed on Dec. 30, 2013, both of which are hereby incorporated by reference in their entireties.

TECHNICAL FIELD

Embodiments of the present invention relate to the communications field, and more specifically, to a status information update method and a mobile terminal.

BACKGROUND

As an information recording tool, an address book has relatively high accuracy, and can facilitate communication between people.

However, a current address book is manually recorded by a user, and when contact information of a contact in the address book changes, the user needs to notify another contact, and the another contact also needs to manually update corresponding contact information, resulting in poor user experience.

SUMMARY

Embodiments of the present invention provide a status information update method, which can resolve a problem of poor user experience.

According to a first aspect, a status information update method is provided, including: receiving, by a first mobile terminal, a status update message sent by a second mobile terminal, where the status update message is used to indicate a change of a status of the second mobile terminal; and updating, by the first mobile terminal according to the status update message, status information of the second mobile terminal that is stored in the first mobile terminal.

With reference to the first aspect, in a first possible implementation manner, before the receiving, by a first mobile terminal, a status update message sent by a second mobile terminal, the method further includes: sending, by the first mobile terminal, a status request message to the second mobile terminal, where the status request message is used to request the change of the status of the second mobile terminal.

With reference to the first possible implementation manner of the first aspect, in a second possible implementation manner, the status request message includes an identifier of the first mobile terminal and an identifier of the second mobile terminal.

With reference to the first possible implementation manner of the first aspect or the second possible implementation manner of the first aspect, in a third possible implementation manner, the status request message further includes the status.

With reference to the third possible implementation manner of the first aspect, in a fourth possible implementation manner, the status request message further includes a last update time of the status, and the status update message is used to indicate a change of the status after the last update time.

With reference to the first aspect or any one of the foregoing possible implementation manners of the first aspect, in a fifth possible implementation manner, the method further includes: presenting, by the first mobile terminal, the status information of the second mobile terminal, where the status information of the second mobile terminal includes an identifier of a user of the second mobile terminal and the status of the second mobile terminal.

With reference to the first aspect or any one of the foregoing possible implementation manners of the first aspect, in a sixth possible implementation manner, the method further includes: determining, by the first mobile terminal according to the status information of the second mobile terminal, a communication manner that is between the first mobile terminal and the second mobile terminal and supported by the first mobile terminal; and presenting, by the first mobile terminal, the communication manner.

With reference to the sixth possible implementation manner of the first aspect, in a seventh possible implementation manner, the determining, by the first mobile terminal according to the status information of the second mobile terminal, a communication manner that is between the first mobile terminal and the second mobile terminal and supported by the first mobile terminal includes: determining, by the first mobile terminal according to status information of the first mobile terminal and the status information of the second mobile terminal, the communication manner that is between the first mobile terminal and the second mobile terminal and supported by the first mobile terminal.

With reference to the first aspect or any one of the foregoing possible implementation manners of the first aspect, in an eighth possible implementation manner, the status includes at least one of the following: a number, a terminal type, a battery status, an operating system, a network status, a package status, a current working mode, a current location, and weather of the current location.

With reference to the first aspect or any one of the foregoing possible implementation manners of the first aspect, in a ninth possible implementation manner, when the status includes the number, the status update message includes a new number of the second mobile terminal and an old number of the second mobile terminal; and the updating, by the first mobile terminal according to the status update message, status information of the second mobile terminal that is stored in the first mobile terminal includes: replacing, by the first mobile terminal, the old number stored in the first mobile terminal with the new number.

With reference to any one of the foregoing possible implementation manners of the first aspect, in a tenth possible implementation manner, a format of the status request message is an SMS message format or a data packet format.

With reference to the first aspect or any one of the foregoing possible implementation manners of the first aspect, in an eleventh possible implementation manner, a format of the status update message is an SMS message format or a data packet format.

According to a second aspect, a status information update method is provided, including: generating, by a second mobile terminal, a status update message, where the status update message is used to indicate a change of a status of the second mobile terminal; and sending, by the second mobile terminal, the status update message to a first mobile terminal.

With reference to the second aspect, in a first possible implementation manner, the method further includes: receiving, by the second mobile terminal, a status request message sent by the first mobile terminal, where the status request message is used to request the change of the status of the second mobile terminal; and the generating, by a second mobile terminal, a status update message includes: generating, by the second mobile terminal, the status update message according to the status request message.

With reference to the first possible implementation manner of the second aspect, in a second possible implementation manner, the status request message includes an identifier of the first mobile terminal and an identifier of the second mobile terminal.

With reference to the first possible implementation manner of the second aspect or the second possible implementation manner of the second aspect, in a third possible implementation manner, the status request message further includes the status.

With reference to the third possible implementation manner of the second aspect, in a fourth possible implementation manner, the status request message further includes a last update time of the status, and the status update message is used to indicate a change of the status after the last update time.

With reference to the second aspect or any one of the foregoing possible implementation manners of the second aspect, in a fifth possible implementation manner, the generating, by a second mobile terminal, a status update message includes: generating, by the second mobile terminal, the status update message according to a sharing policy, where the sharing policy includes a policy of sharing the status by the second mobile terminal.

With reference to the second aspect or any one of the foregoing possible implementation manners of the second aspect, in a sixth possible implementation manner, the status includes at least one of the following: a number, a terminal type, a battery status, an operating system, a network status, a package status, a current working mode, a current location, and weather of the current location.

With reference to the second aspect or any one of the foregoing possible implementation manners of the second aspect, in a seventh possible implementation manner, when the second mobile terminal detects a number change of the second mobile terminal, the status includes the number, and the status update message includes a new number of the second mobile terminal and an old number of the second mobile terminal.

With reference to the second aspect or any one of the foregoing possible implementation manners of the second aspect, in an eighth possible implementation manner, the sending, by the second mobile terminal, the status update message to a first mobile terminal includes: displaying, by the second mobile terminal, the status update message, so that a user of the second mobile terminal enters an instruction; and sending, by the second mobile terminal, the status update message to the first mobile terminal according to the instruction.

With reference to any one of the foregoing possible implementation manners of the second aspect, in a ninth possible implementation manner, a format of the status request message is an SMS message format or a data packet format.

With reference to the second aspect or any one of the foregoing possible implementation manners of the second aspect, in a tenth possible implementation manner, a format of the status update message is an SMS message format or a data packet format.

According to a third aspect, a mobile terminal is provided, including: a receiving unit, configured to receive a status update message sent by another mobile terminal, where the status update message is used to indicate a change of a status of the another mobile terminal; and an updating unit, configured to update, according to the status update message received by the receiving unit, status information of the another mobile terminal that is stored in the mobile terminal.

With reference to the third aspect, in a first possible implementation manner, the mobile terminal further includes: a sending unit, configured to send a status request message to the another mobile terminal, where the status request message is used to request the change of the status of the another mobile terminal.

With reference to the first possible implementation manner of the third aspect, in a second possible implementation manner, the status request message sent by the sending unit includes an identifier of the mobile terminal and an identifier of the another mobile terminal.

With reference to the first possible implementation manner of the third aspect or the second possible implementation manner of the third aspect, in a third possible implementation manner, the status request message sent by the sending unit further includes the status.

With reference to the third possible implementation manner of the third aspect, in a fourth possible implementation manner, the status request message sent by the sending unit further includes a last update time of the status, and the status update message is used to indicate a change of the status after the last update time.

With reference to the third aspect or any one of the foregoing possible implementation manners of the third aspect, in a fifth possible implementation manner, the mobile terminal further includes: a presenting unit, configured to present the status information of the another mobile terminal, where the status information of the another mobile terminal includes an identifier of a user of the another mobile terminal and the status of the another mobile terminal.

With reference to the third aspect or any one of the foregoing possible implementation manners of the third aspect, in a sixth possible implementation manner, the mobile terminal further includes: a determining unit, configured to determine, according to the status information of the another mobile terminal that is updated by the updating unit, a communication manner that is between the mobile terminal and the another mobile terminal and supported by the mobile terminal; and a presenting unit, configured to present the communication manner determined by the determining unit.

With reference to the sixth possible implementation manner of the third aspect, in a seventh possible implementation manner, the determining unit is specifically configured to determine, according to status information of the mobile terminal and the status information of the another mobile terminal that is updated by the updating unit, the communication manner that is between the mobile terminal and the another mobile terminal and supported by the mobile terminal.

With reference to the third aspect or any one of the foregoing possible implementation manners of the third aspect, in an eighth possible implementation manner, the status includes at least one of the following: a number, a terminal type, a battery status, an operating system, a network status, a package status, a current working mode, a current location, and weather of the current location.

With reference to the third aspect or any one of the foregoing possible implementation manners of the third aspect, in a ninth possible implementation manner, when the status includes the number, the status update message received by the receiving unit includes a new number of the another mobile terminal and an old number of the another mobile terminal; and the updating unit is specifically configured to replace the old number stored in the mobile terminal with the new number.

With reference to any one of the foregoing possible implementation manners of the third aspect, in a tenth possible implementation manner, a format of the status request message sent by the sending unit is an SMS message format or a data packet format.

With reference to the third aspect or any one of the foregoing possible implementation manners of the third aspect, in an eleventh possible implementation manner, a format of the status update message received by the receiving unit is an SMS message format or a data packet format.

According to a fourth aspect, a mobile terminal is provided, including: a generation unit, configured to generate a status update message, where the status update message is used to indicate a change of a status of the mobile terminal; and a sending unit, configured to send the status update message generated by the generation unit to another mobile terminal.

With reference to the fourth aspect, in a first possible implementation manner, the mobile terminal further includes: a receiving unit, configured to receive a status request message sent by the another mobile terminal, where the status request message is used to request the change of the status of the mobile terminal.

With reference to the first possible implementation manner of the fourth aspect, in a second possible implementation manner, the status request message received by the receiving unit includes an identifier of the mobile terminal and an identifier of the another mobile terminal.

With reference to the first possible implementation manner of the fourth aspect or the second possible implementation manner of the fourth aspect, in a third possible implementation manner, the status request message received by the receiving unit further includes the status.

With reference to the third possible implementation manner of the fourth aspect, in a fourth possible implementation manner, the status request message received by the receiving unit further includes a last update time of the status, and the status update message generated by the generation unit is used to indicate a change of the status after the last update time.

With reference to the fourth aspect or any one of the foregoing possible implementation manners of the fourth aspect, in a fifth possible implementation manner, the generation unit is specifically configured to generate the status update message according to a sharing policy, where the sharing policy includes a policy of sharing the status by the mobile terminal.

With reference to the fourth aspect or any one of the foregoing possible implementation manners of the fourth aspect, in a sixth possible implementation manner, the status includes at least one of the following: a number, a terminal type, a battery status, an operating system, a network status, a package status, a current working mode, a current location, and weather of the current location.

With reference to the fourth aspect or any one of the foregoing possible implementation manners of the fourth aspect, in a seventh possible implementation manner, when the mobile terminal detects a number change of the mobile terminal, the status includes the number, and the status update message generated by the generation unit includes a new number of the mobile terminal and an old number of the mobile terminal.

With reference to the fourth aspect or any one of the foregoing possible implementation manners of the fourth aspect, in an eighth possible implementation manner, the sending unit includes: a displaying subunit, configured to display the status update message generated by the generation unit, so that a user of the mobile terminal enters an instruction; an acquiring subunit, configured to acquire the instruction entered by the user of the mobile terminal; and a sending subunit, configured to send the status update message to the another mobile terminal according to the instruction acquired by the acquiring subunit.

With reference to any one of the foregoing possible implementation manners of the fourth aspect, in a ninth possible implementation manner, a format of the status request message received by the receiving unit is an SMS message format or a data packet format.

With reference to the fourth aspect or any one of the foregoing possible implementation manners of the fourth aspect, in a tenth possible implementation manner, a format of the status update message generated by the generation unit is an SMS message format or a data packet format.

According to the embodiments of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that in the embodiments of the present invention, a mobile terminal includes but is not limited to a mobile phone, a tablet computer, a watch that has a communication function, and the like. The mobile terminal may communicate with one or more core networks by using a radio access network (RAN). For example, the mobile terminal may be a handset, or may be a mobile phone (or referred to as a "cellular" phone), or may be a portable, pocket-sized, handheld, computer built-in, or vehicle-mounted mobile apparatus. The present invention sets no limitation thereto.

Figure 1:
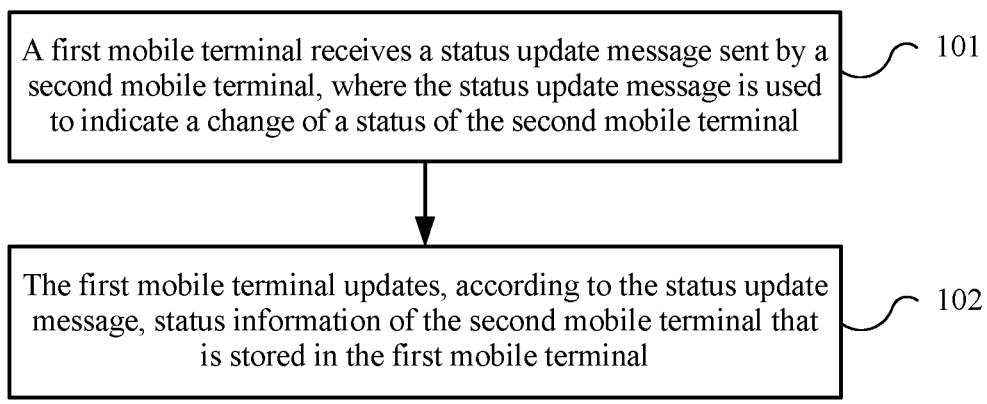
FIG. 1 is a flowchart of a status information update method according to an embodiment of the present invention.

FIG. 1 is a flowchart of a status information update method according to an embodiment of the present invention. The method shown in FIG. 1 includes the following steps:

101. A first mobile terminal receives a status update message sent by a second mobile terminal, where the status update message is used to indicate a change of a status of the second mobile terminal.

102. The first mobile terminal updates, according to the status update message, status information of the second mobile terminal that is stored in the first mobile terminal.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

In this embodiment of the present invention, the status may include at least one of the following: a number, a terminal type, a battery status, an operating system, a network status, a package status, a current working mode, a current location, and weather of the current location.

For example, the terminal type therein may be a mobile phone, a tablet computer, or a watch. The battery status may include a battery level status and/or a current battery status, where the current battery status may be a charging state, or may be a power saving mode. The operating system may be iOS, or Android, or may be Windows Phone. The network status may be a Global System for Mobile Communications (GSM), or may be 2G, 3G, 4G, or Wireless Fidelity (wifi). The package status may include one or more of the following: an SMS message package status, a talk time package status, and an online traffic package status. The current working mode may be a normal mode, may be an airplane mode, may be a vibration mode, or may be a silent mode. The current location may be a current time zone, or may be a current city. The weather of the current location may include weather conditions and may further include a temperature. It should be noted that the foregoing listed statuses are merely some exemplary examples, and may be other statuses, which is not limited by the present invention.

In this embodiment of the present invention, the status information of the second mobile terminal that is stored in the first mobile terminal may be displayed below a contact in an address book, or may be displayed in another form, which is not limited by the present invention.

Optionally, the status update message in step 101 may be actively sent by the second mobile terminal. In this case, the second mobile terminal may periodically detect the status of the second mobile terminal. When detecting that the status of the second mobile terminal has an update, the second mobile terminal generates the status update message. Alternatively, the second mobile terminal may generate the status update message by means of event triggering.

For example, when the second mobile terminal periodically detects that a number of the second mobile terminal changes, or when the second mobile terminal is triggered by an event of SIM card replacement, a status update message may be generated, and the status update message may include a new number of the second mobile terminal and an old number of the second mobile terminal.

Correspondingly, in step 102, the first mobile terminal replaces, according to the status update message, the old number of the second mobile terminal that is stored in the first mobile terminal with the new number of the second mobile terminal. Specifically, the first mobile terminal may perform matching by using the old number of the second mobile terminal, and after matching succeeds, replace the stored old number of the second mobile terminal with the new number of the second mobile terminal.

For example, when the status information of the second mobile terminal that is stored in the first mobile terminal is a first contact in an address book, the first mobile terminal finds the first contact in the address book by means of matching by using an old number, and replaces the old number of the first contact with a new number. The number herein may be a telephone number.

In this way, when detecting that the number of the second mobile terminal changes, the second mobile terminal may actively send a changed number of the second mobile terminal to the first mobile terminal. The first mobile terminal may be a second contact stored in an address book of the second mobile terminal. Correspondingly, the first mobile terminal may automatically update the number of the second mobile terminal according to the status update message. In this way, user operations on a mobile terminal can be reduced, which improves user experience.

Further, after step 102, the first mobile terminal may present the status information of the second mobile terminal. For example, the first mobile terminal may present, on a display interface of the first mobile terminal, an identifier of a user of the second mobile terminal and the status information of the second mobile terminal.

For example, when the status information of the second mobile terminal that is stored in the first mobile terminal is a first contact in an address book, the identifier of the user of the second mobile terminal may be a name of the first contact, and the status information of the second mobile terminal may include a new number of the second mobile terminal. The first mobile terminal may present the name of the first contact and the new number. In addition, the first mobile terminal may also present other status information of the first contact at the same time.

Alternatively, further, after step 102, the first mobile terminal may determine, according to the status information of the second mobile terminal, a communication manner that is between the first mobile terminal and the second mobile terminal and supported by the first mobile terminal, and present the communication manner.

Specifically, the first mobile terminal may also determine the communication manner according to status information of the first mobile terminal and the status information of the second mobile terminal.

The communication manner described herein may be a voice call, may be a video call, may be an SMS message, may be an instant communication tool, or may be another communication manner; or may be one or more of the foregoing listed communication manners. The present invention sets no limitation thereto.

For example, if in step 102, the status information of the second mobile terminal that is updated by the first mobile terminal includes that a network status of the second mobile terminal is wifi, and the first mobile terminal detects that a network status of the first mobile terminal is also wifi, the first mobile terminal determines that the communication manner that is between the first mobile terminal and the second mobile terminal and supported by the first mobile terminal is an instant communication tool. Further, the first mobile terminal may present the instant communication tool. In this embodiment of the present invention, a form in which the first mobile terminal presents the communication manner is not limited. For example, it may be presented in different colors or different gray scales, or may be presented in another form.

For example, when the status information of the second mobile terminal that is stored in the first mobile terminal is a first contact in an address book, the communication manner that is between the first mobile terminal and the first contact and presented by the first mobile terminal may be an instant communication tool. It may be understood as that the first mobile terminal recommends that a user of the first mobile terminal contact the first contact by using the instant communication tool. The instant communication tool herein may include but is not limited to Skype, FaceTime, QQ, WeChat, EasyChat, and the like. Optionally, the first mobile terminal may present the instant communication tool in black, so as to indicate that the instant communication tool is a recommended communication manner. At the same time, a communication manner such as a voice call or an SMS message is presented in gray, so as to indicate that the communication manner is not recommended.

Optionally, generation of the status update message in step 101 may be triggered by a status request message received by the second mobile terminal. Specifically, before step 101, the first mobile terminal may send a status request message to the second mobile terminal, where the status request message is used to request the change of the status of the second mobile terminal.

For example, the first mobile terminal may receive an instruction, and generate the status request message according to the instruction. The instruction is used to instruct the first mobile terminal to display the status information of the second mobile terminal or to update the status information of the second mobile terminal that is stored in the first mobile terminal.

The instruction may be an instruction preset by a user of the first mobile terminal. For example, the instruction may be a command to periodically update the status information of the second mobile terminal, where the period may be preset by the user and stored in the first mobile terminal.

Alternatively, the instruction may also be that the user taps a specific button on the first mobile terminal. For example, the instruction may be that the user taps the stored status information of the second mobile terminal, may be that the user taps an "Update" key of the stored status information of the second mobile terminal, or may be an instruction of another form, which is not limited by the present invention.

For example, when the status information of the second mobile terminal that is stored in the first mobile terminal is a first contact in an address book, the instruction may be that the user taps the first contact, or the instruction may be that the user taps an "Update" button related to the first contact.

For different cases of the status request message, the following provides a detailed procedure description.

Case 1

The status update message in step 101 may be generated by the second mobile terminal according to a sharing policy, where the sharing policy is a policy that is used by the second mobile terminal to share the status information of the second mobile terminal with another mobile terminal, and the sharing policy may be preconfigured by a user of the second mobile terminal. Specifically, the status update message may include update information of all statuses of the second mobile terminal, or may include update information of some statuses of the second mobile terminal. The present invention sets no limitation thereto.

Specifically, the second mobile terminal first acquires the status information of the second mobile terminal after receiving the status request message. For example, the second mobile terminal may acquire a battery status of the second mobile terminal from a power module of the second mobile terminal, acquire a current location of the second mobile terminal from a GPS positioning module, acquire a current working mode of the second mobile terminal from a processor module, and acquire weather of the current location of the second mobile terminal from an application (Application, APP) in a storage module.

Further, the second mobile terminal may generate the status update message by using the acquired status information of the second mobile terminal and according to the sharing policy.

Specifically, if the sharing policy of the second mobile terminal indicates that all statuses of the second mobile terminal can be shared, the status update message includes update information that is of all the statuses and acquired by the second mobile terminal.

If the sharing policy of the second mobile terminal indicates that some statuses of the second mobile terminal can be directly shared, and another status needs to be confirmed by the user before being shared, the status update message may include update information of the statuses that are of the second mobile terminal and that can be directly shared; or after the second mobile terminal waits for the user of the second mobile terminal to confirm sharing of a status that needs to be confirmed, the status update message may include update information of the statuses that are of the second mobile terminal and that can be directly shared, and include update information of the status that is of the second mobile terminal and that is confirmed by the user.

Optionally, after step 102, the first mobile terminal may present the status information of the second mobile terminal. For example, the first mobile terminal may present, on a display interface of the first mobile terminal, an identifier of the user of the second mobile terminal and the status information of the second mobile terminal. The identifier of the user of the second mobile terminal described herein may be a name of the user of the second mobile terminal, may be a telephone number of a contact corresponding to the second mobile terminal, or may be another identifier, which is not limited by the present invention.

Alternatively, further, after step 102, the first mobile terminal may determine, according to the status information of the second mobile terminal, a communication manner that is between the first mobile terminal and the second mobile terminal and supported by the first mobile terminal, and present the communication manner.

Specifically, the first mobile terminal may also determine the communication manner according to status information of the first mobile terminal and the status information of the second mobile terminal.

Optionally, in an embodiment, the status request message sent by the first mobile terminal may include an identifier of the first mobile terminal and an identifier of the second mobile terminal. The identifier of the first mobile terminal is used to uniquely identify the first mobile terminal, and the identifier of the second mobile terminal is used to uniquely identify the second mobile terminal. The identifier herein may be a telephone number of a mobile terminal, may be a hardware identifier of a mobile terminal, may be an identifier of software installed in a mobile terminal, or may be another identifier, which is not limited by the present invention.

For example, when the status information of the second mobile terminal that is stored in the first mobile terminal is a first contact in an address book, the status request message may include a telephone number of the first mobile terminal and a telephone number of the second mobile terminal.

Case 2

The status request message sent by the first mobile terminal may include at least one status. Alternatively, the status request message may include at least one status, an identifier of the first mobile terminal, and an identifier of the second mobile terminal. If the at least one status in the status request message includes a number, the identifier of the first mobile terminal may be a name of a user of the first mobile terminal or a number of the first mobile terminal, and the identifier of the second mobile terminal may be a name of a user of the second mobile terminal. If the at least one status in the status request message does not include a number, the identifier of the first mobile terminal may be a name of a user of the first mobile terminal or a number of the first mobile terminal, and the identifier of the second mobile terminal may be a name of a user of the second mobile terminal or a number of the second mobile terminal. The number described herein may be a telephone number.

Specifically, the at least one status in the status request message may be determined by the user of the first mobile terminal, and the first mobile terminal determines, according to an instruction of the user of the first mobile terminal, which status or which statuses are included in the status request message. The instruction of the user herein may be an instruction that is input by the user of the first mobile terminal by using a keypad, input at a specific position of a touchscreen, or input by means of voice; or an instruction of another type, which is not limited by the present invention.

For example, a status carried in the status request message may be selected by the user of the first mobile terminal. When the status information of the second mobile terminal that is stored in the first mobile terminal is a first contact in an address book, and after the user of the first mobile terminal taps an "Update" button related to the first contact, a new session interface pops up in the first mobile terminal, so that the user of the first mobile terminal selects the status carried in the status request message.

Further, the status update message in step 101 may be generated by the second mobile terminal according to the status request message and a sharing policy. The sharing policy is a policy that is used by the second mobile terminal to share the status information of the second mobile terminal with another mobile terminal, and the sharing policy may be preconfigured by the user of the second mobile terminal. Specifically, the status update message may include update information of all statuses of the second mobile terminal, or may include update information of some statuses of the second mobile terminal. The present invention sets no limitation thereto.

For example, if the statuses included in the status request message are a terminal type and an operating system, correspondingly, the status update message may include that the terminal type is a mobile phone and the operating system is iOS. For another example, if the status request message includes a battery status and a package status, the second mobile terminal may determine, according to the sharing policy of the second mobile terminal, that the status update message may include only that the battery status is a charging state.

Optionally, after step 102, the first mobile terminal may present the status information of the second mobile terminal. For example, the first mobile terminal may present, on a display interface of the first mobile terminal, an identifier of the user of the second mobile terminal and the status information of the second mobile terminal. The identifier of the user of the second mobile terminal described herein may be a name of the user of the second mobile terminal, may be a telephone number of a contact corresponding to the second mobile terminal, or may be another identifier, which is not limited by the present invention.

Alternatively, further, after step 102, the first mobile terminal may determine, according to the status information of the second mobile terminal, a communication manner that is between the first mobile terminal and the second mobile terminal and supported by the first mobile terminal, and present the communication manner.

Specifically, the first mobile terminal may also determine the communication manner according to status information of the first mobile terminal and the status information of the second mobile terminal.

Case 3

The status request message sent by the first mobile terminal may include at least one status and a last update time of each status in the at least one status. Alternatively, the status request message may include at least one status, a last update time of each status in the at least one status, an identifier of the first mobile terminal, and an identifier of the second mobile terminal.

If the at least one status in the status request message includes a number, the identifier of the first mobile terminal may be a name of a user of the first mobile terminal or a number of the first mobile terminal, and the identifier of the second mobile terminal may be a name of a user of the second mobile terminal. If the at least one status in the status request message does not include a number, the identifier of the first mobile terminal may be a name of a user of the first mobile terminal or a number of the first mobile terminal, and the identifier of the second mobile terminal may be a name of a user of the second mobile terminal or a number of the second mobile terminal. The number herein may be a telephone number.

Correspondingly, the status update message is used to indicate a change of each status in the at least one status after the last update time. Herein, the change of each status in the at least one status may include update information of each status, or include indication information that each status is not updated.

The status update message herein is generated by the second mobile terminal according to the status request message and a sharing policy. Refer to corresponding descriptions in the foregoing case 1 and case 2, and to avoid repetition, details are not described herein again.

Specifically, the status request message may include at least one status and at least one last update time corresponding to the at least one status. Correspondingly, the status update message in step 101 may include update information of the at least one status after the at least one last update time; or the status update message may include indication information that the at least one status is not updated after the at least one last update time.

If the status update message includes the update information of the at least one status after the at least one last update time, in step 102, the first mobile terminal may update status information of the at least one status according to the update information of the at least one status, and replace a last update time corresponding to the at least one status with a current time.

If the status update message includes the indication information that the at least one status is not updated after the at least one last update time, in step 102, the first mobile terminal may replace a last update time corresponding to the at least one status with a current time.

Optionally, after step 102, the first mobile terminal may present the status information of the second mobile terminal. For example, the first mobile terminal may present, on a display interface of the first mobile terminal, an identifier of the user of the second mobile terminal and the status information of the second mobile terminal. The identifier of the user of the second mobile terminal described herein may be a name of the user of the second mobile terminal, may be a telephone number of a contact corresponding to the second mobile terminal, or may be another identifier, which is not limited by the present invention.

It should be noted that the foregoing listed case 1, case 2, and case 3 are merely a part of the embodiments of the present invention, and all other embodiments derived by persons skilled in the art based on the embodiments of the present invention shall fall within the protection scope of the present invention.

A manner in which the first mobile terminal presents the status information of the second mobile terminal is not limited in this embodiment of the present invention. For example, the first mobile terminal may present, in the display interface of the first mobile terminal, the identifier of the user and the status information that are of the second mobile terminal; may perform presenting in a voice form, or may perform presenting in an image form, which is not limited by the present invention. In addition, the user of the first mobile terminal may perform a further operation according to the presented status information.

The identifier of the user of the second mobile terminal described herein may be the name of the user corresponding to the second mobile terminal. For example, when the status information of the second mobile terminal that is stored in the first mobile terminal is a first contact in an address book, the identifier of the user of the second mobile terminal may be a name of the first contact.

At the same time, the first mobile terminal may perform presenting according to the status information of the second mobile terminal. In this way, user experience can be improved.

Alternatively, further, after step 102, the first mobile terminal may determine, according to the status information of the second mobile terminal, a communication manner that is between the first mobile terminal and the second mobile terminal and supported by the first mobile terminal, and present the communication manner.

Specifically, the first mobile terminal may also determine the communication manner according to status information of the first mobile terminal and the status information of the second mobile terminal.

The communication manner described herein may be a voice call, may be a video call, may be an SMS message, may be an instant communication tool, or may be another communication manner; or may be one or more of the foregoing listed communication manners. The present invention sets no limitation thereto.

In this embodiment of the present invention, a form in which the first mobile terminal presents the communication manner is not limited. For example, the communication manner may be presented in different colors or different gray scales, or may be presented in another form.

For example, when the status information of the second mobile terminal that is stored in the first mobile terminal is a first contact in an address book, and if the status information of the second mobile terminal includes that a network status of the second mobile terminal is 2G and a talk time of a package status has relatively enough remaining quota, the first mobile terminal may present that a communication manner between the first mobile terminal and the first contact is a voice call, that is, the first mobile terminal recommends that the user of the first mobile terminal contact the first contact by using the voice call. If the status information of the second mobile terminal includes that a network status of the second mobile terminal is wifi, and a network status of the first mobile terminal is also wifi, the first mobile terminal may present that a communication manner between the first mobile terminal and the first contact is an instant communication tool, that is, the first mobile terminal recommends that the user of the first mobile terminal contact the first contact by using the instant communication tool. The instant communication tool herein may include but is not limited to Skype, FaceTime, QQ, WeChat, EasyChat, and the like.

In addition, in this embodiment of the present invention, a format of the status request message may be an SMS message format, may be a data packet format, or may be another format, which is not limited by the present invention.

In this embodiment of the present invention, a format of the status update message may be an SMS message format, may be a data packet format, or may be another format, which is not limited by the present invention.

It should be noted that a form in which the first mobile terminal stores the status information of the second mobile terminal is not limited by the present invention. In an embodiment, Table 1 shows a form of a first contact in an address book stored in the first mobile terminal.

TABLE 1

| Identifier | Status information | | |
|---|---|---|---|
| . . . | | . . . | |
| Zhang San | Number | 12345678901 | 2012 Dec. 12 |
| | Operating system | iOS | 2012 Dec. 12 |
| | Network status | 3G | 2013 Feb. 2 |
| | Current working mode | Normal mode | 2013 Dec. 20 |
| | Current location | Beijing | 2013 Jan. 1 |
| | . . . | . . . | . . . |
| . . . | | . . . | |

As shown in Table 1, an identifier of a user of the second mobile terminal that is stored in the first mobile terminal is a name of the user of the second mobile terminal. Zhang San. In addition, the status information of the second mobile terminal that is stored in the first mobile terminal includes a number, an operating system, a network status, a current working mode, a current location, and last update times in a one-to-one correspondence with the statuses.

It should be noted that in this embodiment of the present invention, Table 1 is merely an example of storing the address book by the first mobile terminal, or the address book may be stored in another form, which is not limited by the present invention.

Figure 2:
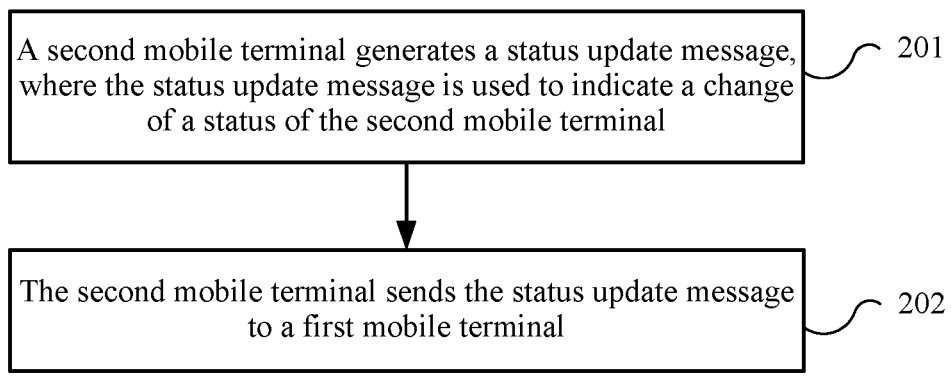
FIG. 2 is a flowchart of a status information update method according to another embodiment of the present invention.

FIG. 2 is a flowchart of a status information update method according to another embodiment of the present invention. The method shown in FIG. 2 includes the following steps:

201. A second mobile terminal generates a status update message, where the status update message is used to indicate a change of a status of the second mobile terminal.

202. The second mobile terminal sends the status update message to a first mobile terminal.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

In this embodiment of the present invention, the status may include at least one of the following: a number, a terminal type, a battery status, an operating system, a network status, a package status, a current working mode, a current location, and weather of the current location.

For example, the terminal type therein may be a mobile phone, a tablet computer, or a watch. The battery status may include a battery level status and/or a current battery status, where the current battery status may be a charging state, or may be a power saving mode. The operating system may be iOS, or Android (Android), or may be winphone. The network status may be a Global System for Mobile Communications (Global System for Mobile communication, GSM), or may be 2G, 3G, 4G, or Wireless Fidelity (Wireless Fidelity, wifi). The package status may include one or more of the following: an SMS message package status, a talk time package status, and an online traffic package status. The current working mode may be a normal mode, may be an airplane mode, may be a vibration mode, or may be a silent mode. The current location may be a current time zone, or may be a current city. The weather of the current location may include weather conditions and may further include a temperature. It should be noted that the foregoing listed statuses are merely some exemplary examples, and may be other statuses, which is not limited by the present invention.

In this embodiment of the present invention, status information of the second mobile terminal that is stored in the first mobile terminal may be displayed below a contact in an address book, or may be displayed in another form, which is not limited by the present invention.

Optionally, the status update message in step 201 may be periodically generated by the second mobile terminal, or may be generated by means of event triggering.

For example, a timer (timer) may be set on the second mobile terminal, and a time period of the timer may be preconfigured by a user of the second mobile terminal. After the configured time period of the timer, the second mobile terminal detects the status of the second mobile terminal, and generates a status update message according to the detected status, where the status update message includes change information of the status detected by the second mobile terminal.

Optionally, in an embodiment, when the second mobile terminal periodically detects that a current number of the second mobile terminal is inconsistent with a number detected last time, or when the second mobile terminal is triggered by an event of SIM card replacement, a status update message may be generated, and the status update message may include a new number of the second mobile terminal and an old number of the second mobile terminal.

Alternatively, the status update message in step 101 may be generated by the second mobile terminal according to a sharing policy after the second mobile terminal performs detection periodically or by means of event triggering. The sharing policy includes a policy of sharing the status of the second mobile terminal by the second mobile terminal. The sharing policy may be preset by the user of the second mobile terminal.

For example, the user of the second mobile terminal may set that all statuses of the second mobile terminal are open. Alternatively, the user of the second mobile terminal may set that a part of statuses is open, another part of statuses is semi-open, and other remaining statuses are unopened.

The open statuses herein mean that update information of the open statuses can be directly used to generate the status update message. The semi-open statuses mean that update information of the semi-open statuses needs to be confirmed by the user of the second mobile terminal before being used to generate the status update message. The unopened statuses mean that update information of the unopened statuses is not used to generate the status update message.

For example, when the user of the second mobile terminal sets that a package status of the second mobile terminal is an unopened status, even if the package status of the second mobile terminal has an update, the status update message in step 201 does not carry the package status of the second mobile terminal.

For example, when the user of the second mobile terminal sets that a current working mode of the second mobile terminal is a semi-open status, a new session interface may pop up when the second mobile terminal detects that the current working mode of the second mobile terminal has an update, so that the user of the second mobile terminal chooses whether to use the update to the current working mode of the second mobile terminal to generate the status update message.

Further, in step 202, the second mobile terminal may send the status update message generated in step 201 to the first mobile terminal. Herein, the first mobile terminal may be a mobile terminal of a second contact in an address book stored in the second mobile terminal. In addition, the second mobile terminal may send the status update message to multiple mobile terminals, where the multiple mobile terminals are in a one-to-one correspondence with multiple contacts in the address book stored in the second mobile terminal.

Alternatively, in step 202, the second mobile terminal first displays the status update message generated in step 201, so that the user of the second mobile terminal enters an instruction. The second mobile terminal may send the status update message to the first mobile terminal according to the instruction.

For example, when the second mobile terminal detects a number change of the second mobile terminal, the status update message includes a new number of the second mobile terminal and an old number of the second mobile terminal.

In this case, the second mobile terminal may display the status update message, so that the user of the second mobile terminal enters a confirmation instruction; or the second mobile terminal may display the status update message and an identifier of the first mobile terminal, so that the user of the second mobile terminal enters a confirmation instruction. Herein, that the user of the second mobile terminal enters a confirmation instruction may be that the user of the second mobile terminal taps an "OK" button in a user interface (User Interface, UI) of the second mobile terminal.

On the other hand, after the second mobile terminal displays the status update message, if the user of the second mobile terminal changes a number of the second mobile terminal only for a while, or the user of the second mobile terminal is unwilling to notify the first mobile terminal of a new number of the second mobile terminal, in this case, the user of the second mobile terminal may enter a denial instruction. In this way, the second mobile terminal does not send the status update message to the first mobile terminal according to the denial instruction. Herein, that the user of the second mobile terminal enters a denial instruction may be that the user of the second mobile terminal taps a "Cancel" button in the UI of the second mobile terminal.

Optionally, the status update message in step 101 may be generated by the second mobile terminal according to a received status request message.

Specifically, before step 201, the second mobile terminal may receive a status request message sent by the first mobile terminal, where the status request message is used to request the change of the status of the second mobile terminal.

For a form and content of the status request message, refer to case 1, case 2, and case 3 in the embodiment in FIG. 1. To avoid repetition, details are not described herein again.

Correspondingly, in step 101, the second mobile terminal may generate the status update message according to the status request message and a sharing policy. The sharing policy includes a policy of sharing the status of the second mobile terminal by the second mobile terminal. The sharing policy may be preset by the user of the second mobile terminal.

For example, the user of the second mobile terminal may set that all statuses of the second mobile terminal are open. Alternatively, the user of the second mobile terminal may set that a part of statuses are open, another part of statuses are semi-open, and other remaining statuses are unopened.

The open statuses herein mean that update information of the open statuses can be directly used to generate the status update message. The semi-open statuses mean that update information of the semi-open statuses needs to be confirmed by the user of the second mobile terminal before being used to generate the status update message; or the semi-open statuses mean that it needs to be determined, according to an identifier of the first mobile terminal, whether update information of the semi-open statuses can be used to generate the status update message. The unopened statuses mean that update information of the unopened statuses is not used to generate the status update message.

For example, when the user of the second mobile terminal sets that a package status of the second mobile terminal is an unopened status, even if a collection of the status request message includes the package status, the status update message in step 201 does not carry the package status of the second mobile terminal.

For example, if the status request message includes a current working mode, when the user of the second mobile terminal sets that a current working mode of the second mobile terminal is a semi-open status, a new session interface may pop up when the second mobile terminal detects that the current working mode of the second mobile terminal has an update, so that the user of the second mobile terminal chooses whether to use the update to the current working mode of the second mobile terminal to generate the status update message.

Alternatively, if the status request message includes a current working mode, when the user of the second mobile terminal sets that a current working mode of the second mobile terminal is a semi-open status, when the second mobile terminal detects that the current working mode of the second mobile terminal has an update, the second mobile terminal first confirms that the first mobile terminal is a mobile terminal of a second contact in an address book stored in the second mobile terminal, and then the second mobile terminal uses the update to the current working mode of the second mobile terminal to generate the status update message.

It should be noted that in this embodiment of the present invention, a manner in which the second mobile terminal detects an update to the status of the second mobile terminal is not limited.

Figure 3:
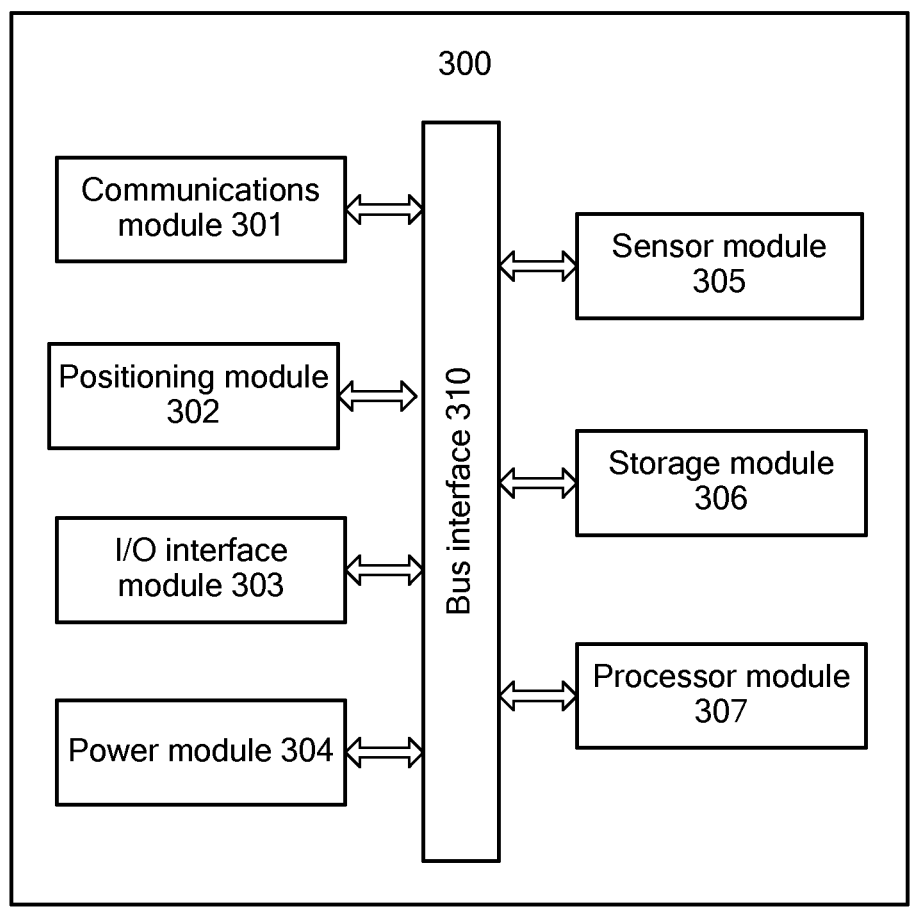
FIG. 3 is an example of a schematic diagram of a module architecture of a second mobile terminal according to another embodiment of the present invention.

FIG. 3 shows an example of a schematic diagram of a module architecture of a second mobile terminal according to another embodiment of the present invention. A second mobile terminal 300 shown in FIG. 3 includes a communications module 301, a positioning module 302, an I/O interface module 303, a power module 304, a sensor module 305, a storage module 306, and a processor module 307. In addition, all modules of the second mobile terminal 300 are connected by using a bus 310.

The I/O interface module 303 may receive input from a touchscreen or a keypad of the second mobile terminal 300, or voice input of the second mobile terminal 300; after the processor module 307 parses out a command, complete execution of an operating instruction of a user by invoking a response application program in the storage module 306; and present an operating result to the user by using a screen or in a voice manner.

The power module 304 provides the second mobile terminal 300 with electric energy required for displaying, calculating, and the like, and may enable the second mobile terminal 300 to acquire battery level information and the like by using the power module 304. The information may be invoked and queried by another module by using a bus interface.

The sensor module 305 may collect multiple types of data required by different applications. For example, a gyroscope sensor may help the positioning module 302 further improve precision.

The storage module 306 stores information such as an operating system and application software that run on the second mobile terminal 300, where the operating system is, for example, iOS, Android, or winphone, and the application software is, for example, WeChat used for social communications, an assistant application used for scheduling, and a map used for positioning.

The processor module 307 is configured to parse, process, and compute all data on the second mobile terminal 300.

Specifically, the second mobile terminal may acquire a battery status of the second mobile terminal from the power module 304, acquire a current location of the second mobile terminal from the positioning module 302, acquire a current working mode of the second mobile terminal from the processor module 307, acquire weather of the current location of the second mobile terminal from an application (Application, APP) in the storage module 306, and the like.

In addition, in step 202, the second mobile terminal 300 may send status update information to a first mobile terminal in a wireless cellular communication manner or a WLAN communication manner of the communications module 301.

In addition, in this embodiment of the present invention, a format of a status request message may be an SMS message format, may be a data packet format, or may be another format, which is not limited by the present invention.

In this embodiment of the present invention, a format of a status update message may be an SMS message format, may be a data packet format, or may be another format, which is not limited by the present invention.

Figure 4:
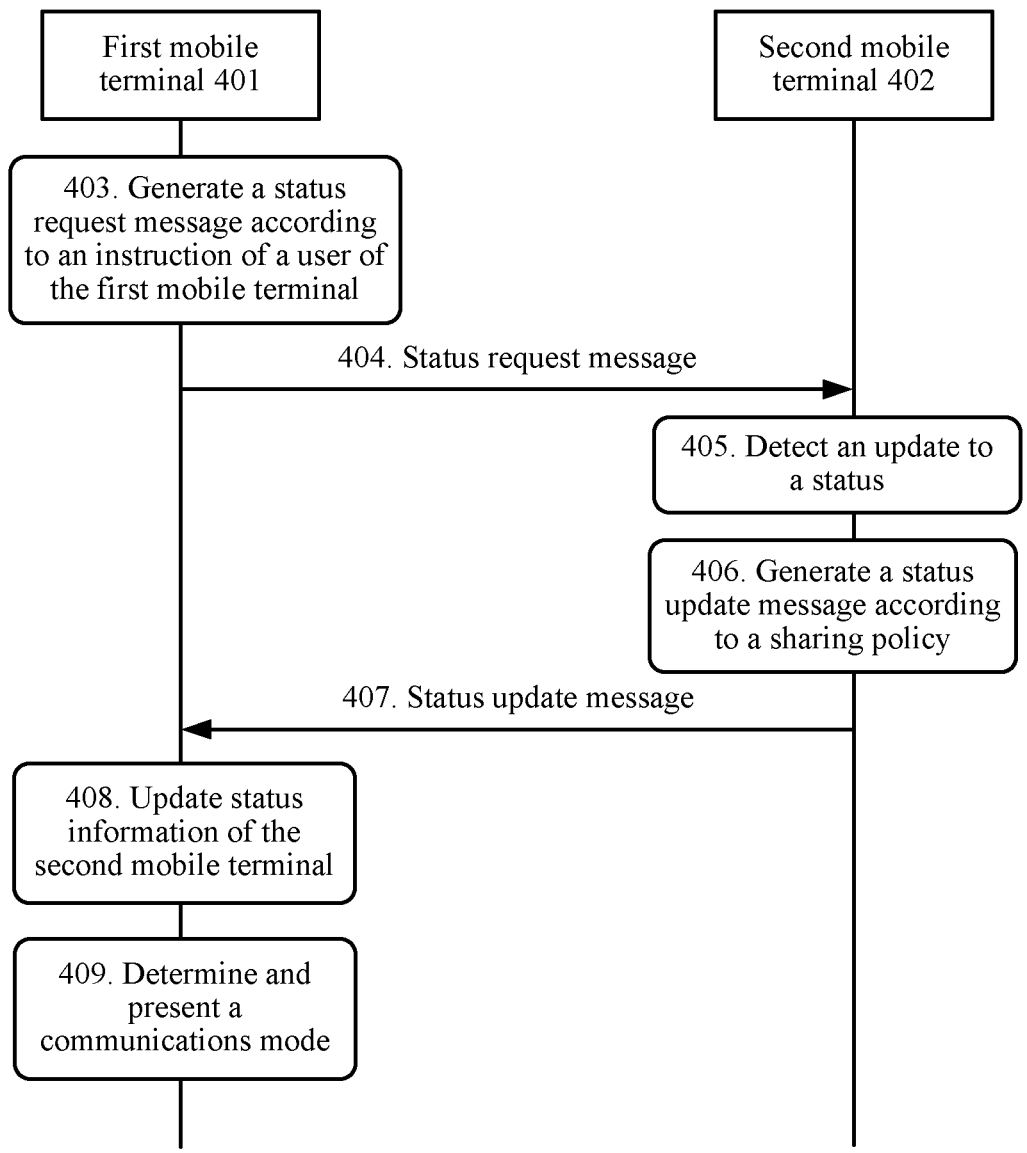
FIG. 4 is a flowchart of a status information update method according to another embodiment of the present invention.

FIG. 4 is a flowchart of a status information update method according to another embodiment of the present invention. The method shown in FIG. 4 includes the following steps:

403. A first mobile terminal 401 generates a status request message according to an instruction of a user of the first mobile terminal 401.

Specifically, the user of the first mobile terminal 401 taps an "Update" key of status information of a second mobile terminal that is stored in the first mobile terminal 401. In addition, in a new session interface popping up accordingly, the user of the first mobile terminal 401 selects: Statuses that need to be updated are a battery status and a current location.

Correspondingly, the first mobile terminal 401 generates the status request message, where the status request message includes the battery status and the current location.

404. The first mobile terminal 401 sends the status request message to a second mobile terminal 402.

Specifically, the first mobile terminal 401 may send the status request message to the second mobile terminal 402 by using a wireless cellular network.

405. The second mobile terminal 402 detects an update to a status.

Specifically, the second mobile terminal 402 obtains by means of parsing that statuses in the status request message are the battery status and the current location. Further, the second mobile terminal 402 acquires, by using a power module, that the battery status is a charging state, and acquires, by using a positioning module, that the current location is Beijing.

406. The second mobile terminal 402 generates a status update message according to a sharing policy.

Specifically, if a user of the second mobile terminal 402 preconfigures that a battery status of the second mobile terminal is an open status, and preconfigures that a current location of the second mobile terminal is a semi-open status, the second mobile terminal 402 may wait for the user of the second mobile terminal 402 to confirm whether the current location of the second mobile terminal can be sent to the first mobile terminal 401, or the second mobile terminal 402 may detect whether the first mobile terminal 401 is a contact in an address book of the second mobile terminal 402.

When the user of the second mobile terminal 402 confirms or the second mobile terminal 402 detects that the first mobile terminal 401 is a contact in the address book of the second mobile terminal 402, the second mobile terminal 402 may generate the status update message. The status update message includes: The battery status is a charging state, and the current location is Beijing.

407. The second mobile terminal 402 sends the status update message generated in step 406 to the first mobile terminal 401.

Specifically, the second mobile terminal 402 may send the status update message to the first mobile terminal 401 by using the wireless cellular network.

408. The first mobile terminal 401 updates status information of the second mobile terminal 402 that is stored in the first mobile terminal 401.

Specifically, the first mobile terminal 401 updates the stored battery status of the second mobile terminal 402 to a charging state, and updates the stored current location of the second mobile terminal 402 to Beijing.

409. The first mobile terminal 401 determines a communication manner that is between the first mobile terminal 401 and the second mobile terminal 402 and supported by the first mobile terminal 401, and presents the communication manner.

Specifically, the first mobile terminal 401 may determine, according to that the battery status of the second mobile terminal 402 is a charging state, that the communication manner is an SMS message or an instant communication tool. Further, the first mobile terminal 401 may present the communication manner.

For example, the first mobile terminal 401 may display the SMS message and the instant communication tool in black, and display a voice call and a video call in gray. That is, the first mobile terminal 401 indicates a recommended communication manner in black, and indicates, in gray, a communication manner that is not recommended. In this way, the user of the first mobile terminal 401 may communicate with the second mobile terminal 402 in the communication manner presented by the first mobile terminal 401.

In this way, in this embodiment of the present invention, a first mobile terminal may directly acquire status information of a second mobile terminal from the second mobile terminal by sending a status request message to the second mobile terminal, and further present, according to the status information, a communication manner that is between the first mobile terminal and the second mobile terminal and supported by the first mobile terminal, which can improve user experience.

Figure 5:
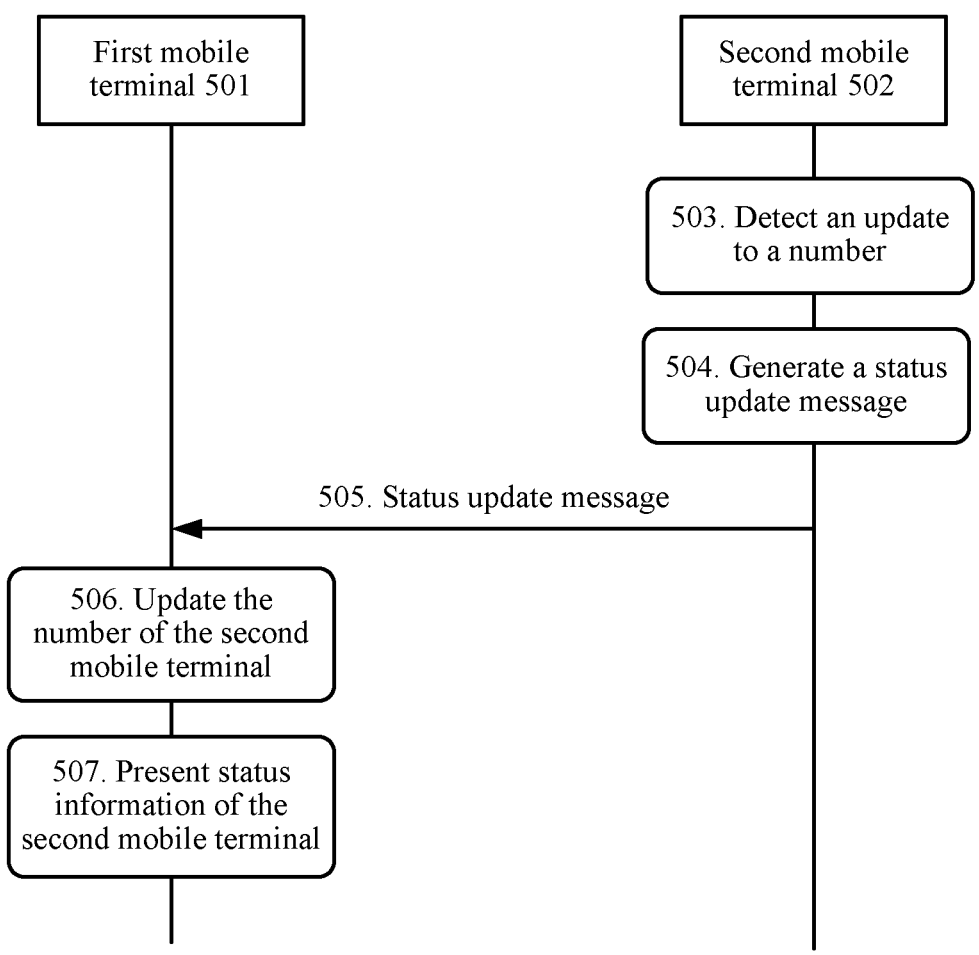
FIG. 5 is a flowchart of a status information update method according to another embodiment of the present invention.

FIG. 5 is a flowchart of a status information update method according to another embodiment of the present invention. The method shown in FIG. 5 includes the following steps:

503. A second mobile terminal 502 detects an update to a number.

Specifically, the second mobile terminal 502 detects the number of itself, and when detecting that a current number is inconsistent with a number detected last time, the second mobile terminal 502 detects the update to the number.

504. The second mobile terminal 502 generates a status update message.

Specifically, the status update message generated by the second mobile terminal 502 includes replacing an old number of the second mobile terminal with a new number of the second mobile terminal.

505. The second mobile terminal 502 sends the status update message generated in step 504 to a first mobile terminal 501.

Specifically, the second mobile terminal 502 may send the status update message to the first mobile terminal 501 by using a wireless cellular network. The first mobile terminal 501 is a second contact stored in an address book of the second mobile terminal 502, and the second mobile terminal 502 may send the status update message to the first mobile terminal 501 by using a number of the first mobile terminal 501.

506. The first mobile terminal 501 updates the number of the second mobile terminal 502.

Specifically, after receiving the status update message, the first mobile terminal 501 finds by means of matching, according to the old number of the second mobile terminal that is in the status update message, a first contact stored in an address book of the first mobile terminal 501, and then replaces a number of the first contact with the new number of the second mobile terminal.

507. The first mobile terminal 501 presents status information of the second mobile terminal 502.

Specifically, the first mobile terminal 501 may present an identifier of a user of the second mobile terminal and the new number of the second mobile terminal. The identifier of the user of the second mobile terminal herein may be a name of the first contact.

Alternatively, the first mobile terminal 501 may perform displaying in an SMS message form, so as to present the new number of the second mobile terminal to a user of the first mobile terminal 501.

In this way, in this embodiment of the present invention, when detecting an update to a number, a second mobile terminal actively sends a number update message to a first mobile terminal, which can enable the first mobile terminal to update contact information of a user of the second mobile terminal in time, and can improve user experience.

It should be noted that the embodiments shown in FIG. 4 and FIG. 5 are merely a part of the embodiments of the present invention, and all other embodiments derived by persons skilled in the art based on the foregoing embodiments shall fall within the protection scope of the present invention.

Figure 6:
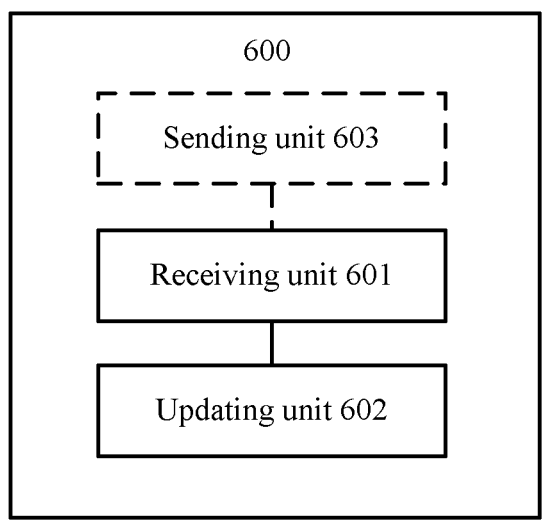
FIG. 6 is a block diagram of a mobile terminal according to an embodiment of the present invention.

FIG. 6 is a block diagram of a mobile terminal according to an embodiment of the present invention. A mobile terminal 600 shown in FIG. 6 includes a receiving unit 601 and an updating unit 602.

The receiving unit 601 is configured to receive a status update message sent by another mobile terminal, where the status update message is used to indicate a change of a status of the another mobile terminal. The updating unit 602 is configured to update, according to the status update message received by the receiving unit 601, status information of the another mobile terminal that is stored in the mobile terminal 600.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

Optionally, in an embodiment, the mobile terminal 600 further includes a sending unit 603. The sending unit 603 is configured to send a status request message to the another mobile terminal, where the status request message is used to request the change of the status of the another mobile terminal.

Optionally, in another embodiment, the status request message sent by the sending unit 603 may include an identifier of the mobile terminal 600 and an identifier of the another mobile terminal.

Optionally, in another embodiment, the status request message sent by the sending unit 603 may further include a status.

Optionally, in another embodiment, the status request message sent by the sending unit 603 may further include a last update time of the status, and the status update message is used to indicate a change of the status after the last update time.

Optionally, in another embodiment, the mobile terminal 600 may further include a presenting unit. The presenting unit is configured to present the status information of the another mobile terminal, where the status information of the another mobile terminal includes an identifier of a user of the another mobile terminal and the status of the another mobile terminal.

Optionally, in another embodiment, the mobile terminal 600 may further include a determining unit and a presenting unit. The determining unit may be configured to determine, according to the status information of the another mobile terminal that is updated by the updating unit 602, a communication manner that is between the mobile terminal 600 and the another mobile terminal and supported by the mobile terminal 600. The presenting unit may be configured to present the communication manner determined by the determining unit. Optionally, the determining unit may determine, according to status information of the mobile terminal 600 and the status information of the another mobile terminal that is updated by the updating unit 602, the communication manner that is between the mobile terminal 600 and the another mobile terminal and supported by the mobile terminal 600.

Optionally, in another embodiment, the status includes at least one of the following: a number, a terminal type, a battery status, an operating system, a network status, a package status, a current working mode, a current location, and weather of the current location.

Optionally, in another embodiment, when the status includes the number, the status update message received by the receiving unit 601 may include a new number of the another mobile terminal and an old number of the another mobile terminal. The updating unit 602 is specifically configured to replace the old number stored in the mobile terminal 600 with the new number.

Optionally, in another embodiment, a format of the status request message sent by the sending unit 603 may be an SMS message format or a data packet format.

Optionally, in another embodiment, a format of the status update message received by the receiving unit 601 may be an SMS message format or a data packet format.

Figure 7:
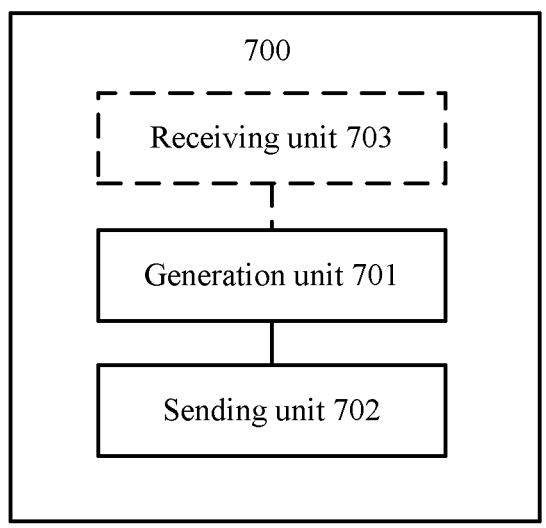
FIG. 7 is a block diagram of a mobile terminal according to another embodiment of the present invention.

FIG. 7 is a block diagram of a mobile terminal according to another embodiment of the present invention. A mobile terminal 700 shown in FIG. 7 includes a generation unit 701 and a sending unit 702.

The generation unit 701 is configured to generate a status update message, where the status update message is used to indicate a change of a status of the mobile terminal 700. The sending unit 702 is configured to send the status update message generated by the generation unit 701 to another mobile terminal.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

Optionally, in an embodiment, the mobile terminal 700 further includes a receiving unit 703. The receiving unit 703 may be configured to receive a status request message sent by the another mobile terminal, where the status request message is used to request the change of the status of the mobile terminal 700.

Optionally, in another embodiment, the status request message received by the receiving unit 703 may include an identifier of the mobile terminal 700 and an identifier of the another mobile terminal.

Optionally, in another embodiment, the status request message received by the receiving unit 703 may further include a status.

Optionally, in another embodiment, the status request message received by the receiving unit 703 may further include a last update time of the status, and the status update message generated by the generation unit 701 may be used to indicate a change of the status after the last update time.

Optionally, in another embodiment, the generation unit 701 may be specifically configured to generate the status update message according to a sharing policy, where the sharing policy includes a policy of sharing the status by the mobile terminal 700.

Optionally, in another embodiment, the status may include at least one of the following: a number, a terminal type, a battery status, an operating system, a network status, a package status, a current working mode, a current location, and weather of the current location.

Optionally, in another embodiment, when the mobile terminal 700 detects a number change of the mobile terminal 700, the status may include the number, and the status update message generated by the generation unit 701 may include a new number of the mobile terminal 700 and an old number of the mobile terminal 700.

Optionally, in another embodiment, the sending unit 702 may include a displaying subunit, an acquiring subunit, and a sending subunit. The displaying subunit may be configured to display the status update message generated by the generation unit 701, so that a user of the mobile terminal 700 enters an instruction. The acquiring subunit may be configured to acquire the instruction entered by the user of the mobile terminal 700. The sending subunit may be configured to send the status update message to the another mobile terminal according to the instruction acquired by the acquiring subunit.

Optionally, in another embodiment, a format of the status request message received by the receiving unit 703 may be an SMS message format or a data packet format.

Optionally, in another embodiment, a format of the status update message generated by the generation unit 701 may be an SMS message format or a data packet format.

Figure 8:
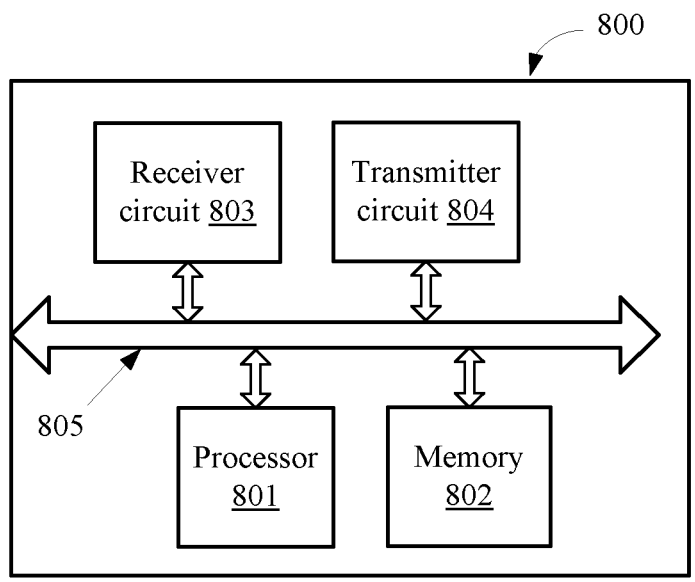
FIG. 8 is a block diagram of a mobile terminal according to another embodiment of the present invention.

FIG. 8 is a block diagram of a mobile terminal according to another embodiment of the present invention. A mobile terminal 800 shown in FIG. 8 includes a processor 801, a memory 802, a receiver circuit 803, and a transmitter circuit 804.

The receiver circuit 803 is configured to receive a status update message sent by another mobile terminal, where the status update message is used to indicate a change of a status of the another mobile terminal. The processor 801 is configured to update, according to the status update message received by the receiver circuit 803, status information of the another mobile terminal that is stored in the mobile terminal 800.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

All components of the mobile terminal 800 are coupled together by using a bus system 805, where in addition to including a data bus, the bus system 805 includes a power bus, a control bus, and a status signal bus. However, for clarity of description, various buses are marked as the bus system 805 in FIG. 8.

The methods disclosed in the foregoing embodiments of the present invention may be applied to the processor 801, or implemented by the processor 801. The processor 801 may be an integrated circuit chip and has a signal processing capability. In an implementation process, the steps in the foregoing methods may be completed by means of an integrated logic circuit of hardware in the processor 801 or an instruction in a form of software. The foregoing processor 801 may be a general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logical device, discrete gate or transistor logical device, or discrete hardware component. The processor 801 may implement or execute methods, steps and logical block diagrams disclosed in the embodiments of the present invention. The general purpose processor may be a microprocessor or the processor may be any conventional processor and the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory (Random Access Memory, RAM), a flash memory, a read-only memory (Read-Only Memory, ROM), a programmable read-only memory, an electrically-erasable programmable memory, or a register. The storage medium is located in the memory 802, and the processor 801 reads information in the memory 802 and completes the steps in the foregoing methods in combination with hardware of the processor 801.

Optionally, in an embodiment, the transmitter circuit 804 may be configured to send a status request message to the another mobile terminal, where the status request message is used to request the change of the status of the another mobile terminal.

Optionally, in another embodiment, the status request message sent by the transmitter circuit 804 may include an identifier of the mobile terminal 800 and an identifier of the another mobile terminal.

Optionally, in another embodiment, the status request message sent by the transmitter circuit 804 may further include a status.

Optionally, in another embodiment, the status request message sent by the transmitter circuit 804 may further include a last update time of the status, and the status update message is used to indicate a change of the status after the last update time.

Optionally, in another embodiment, the processor 801 may be further configured to present the status information of the another mobile terminal, where the status information of the another mobile terminal includes an identifier of a user of the another mobile terminal and the status of the another mobile terminal.

Optionally, in another embodiment, the processor 801 may be further configured to: determine, according to the status information of the another mobile terminal, a communication manner that is between the mobile terminal 800 and the another mobile terminal and supported by the mobile terminal 800; and further present the communication manner determined by a determining unit. Optionally, the processor 801 may determine, according to status information of the mobile terminal 800 and the status information of the another mobile terminal, the communication manner that is between the mobile terminal 800 and the another mobile terminal and supported by the mobile terminal 800, and further present the communication manner determined by the determining unit.

Optionally, in another embodiment, the status includes at least one of the following: a number, a terminal type, a battery status, an operating system, a network status, a package status, a current working mode, a current location, and weather of the current location.

Optionally, in another embodiment, when the status includes the number, the status update message received by the receiver circuit 803 may include a new number of the another mobile terminal and an old number of the another mobile terminal. The processor 801 is specifically configured to replace the old number stored in the mobile terminal 800 with the new number.

Optionally, in another embodiment, a format of the status request message sent by the transmitter circuit 804 may be an SMS message format or a data packet format.

Optionally, in another embodiment, a format of the status update message received by the receiver circuit 803 may be an SMS message format or a data packet format.

The mobile terminal 800 can implement all processes implemented by a first mobile terminal in the embodiments in FIG. 1 to FIG. 2 and FIG. 4 to FIG. 5. To avoid repetition, details are not described herein again.

Figure 9:
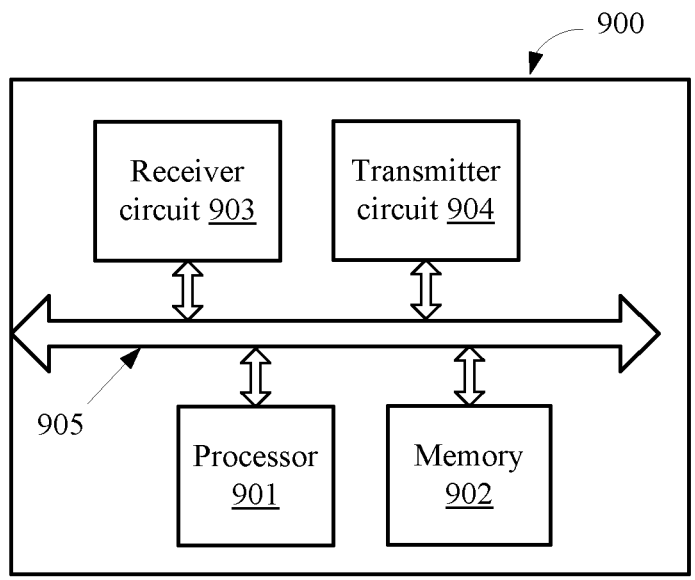
FIG. 9 is a block diagram of a mobile terminal according to another embodiment of the present invention.

FIG. 9 is a block diagram of a mobile terminal according to another embodiment of the present invention. A mobile terminal 900 shown in FIG. 9 includes a processor 901, a memory 902, a receiver circuit 903, and a transmitter circuit 904.

The processor 901 is configured to generate a status update message, where the status update message is used to indicate a change of a status of the mobile terminal 900. The transmitter circuit 904 is configured to send the status update message generated by the processor 901 to another mobile terminal.

According to this embodiment of the present invention, a first mobile terminal directly acquires, from a second mobile terminal, a change of a status of the second mobile terminal, so that the first mobile terminal can update status information related to the second mobile terminal in time and dynamically adjust a communication manner between the first mobile terminal and the second mobile terminal, which can improve user experience.

All components of the mobile terminal 900 are coupled together by using a bus system 905, where in addition to including a data bus, the bus system 905 includes a power bus, a control bus, and a status signal bus. However, for clarity of description, various buses are marked as the bus system 905 in FIG. 9.

The methods disclosed in the foregoing embodiments of the present invention may be applied to the processor 901, or implemented by the processor 901. The processor 901 may be an integrated circuit chip and has a signal processing capability. In an implementation process, the steps in the foregoing methods may be completed by means of an integrated logic circuit of hardware in the processor 901 or an instruction in a form of software. The processor 901 may be a general purpose processor, a DSP, an ASIC, an FPGA, or another programmable logical device, discrete gate or transistor logical device, or discrete hardware component. The processor 901 may implement or execute methods, steps and logical block diagrams disclosed in the embodiments of the present invention. The general purpose processor may be a microprocessor or the processor may be any conventional processor and the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a RAM, a flash memory, a ROM, a programmable read-only memory, an electrically-erasable programmable memory, or a register. The storage medium is located in the memory 902, and the processor 901 reads information in the memory 902 and completes the steps in the foregoing methods in combination with hardware of the processor 901.

Optionally, in an embodiment, the receiver circuit 903 may be configured to receive a status request message sent by the another mobile terminal, where the status request message is used to request the change of the status of the mobile terminal 900.

Optionally, in another embodiment, the status request message received by the receiver circuit 903 may include an identifier of the mobile terminal 900 and an identifier of the another mobile terminal.

Optionally, in another embodiment, the status request message received by the receiver circuit 903 may further include a status.

Optionally, in another embodiment, the status request message received by the receiver circuit 903 may further include a last update time of the status, and the status update message generated by the processor 901 may be used to indicate a change of the status after the last update time.

Optionally, in another embodiment, the processor 901 may be specifically configured to generate the status update message according to a sharing policy, where the sharing policy includes a policy of sharing the status by the mobile terminal 900.

Optionally, in another embodiment, the status may include at least one of the following: a number, a terminal type, a battery status, an operating system, a network status, a package status, a current working mode, a current location, and weather of the current location.

Optionally, in another embodiment, when the mobile terminal 900 detects a number change of the mobile terminal 900, the status may include the number, and the status update message generated by the processor 901 may include a new number of the mobile terminal 900 and an old number of the mobile terminal 900.

Optionally, in another embodiment, the processor 901 may be further configured to: display the status update message, so that a user of the mobile terminal 900 enters an instruction; acquire the instruction entered by the user of the mobile terminal 900; and further send the status update message to the another mobile terminal according to the instruction.

Optionally, in another embodiment, a format of the status request message received by the receiver circuit 903 may be an SMS message format or a data packet format.

Optionally, in another embodiment, a format of the status update message generated by the processor 901 may be an SMS message format or a data packet format.

The mobile terminal 900 can implement all processes implemented by a second mobile terminal in the embodiments in FIG. 1 to FIG. 2 and FIG. 4 to FIG. 5. To avoid repetition, details are not described herein again.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A status information update method, comprising:
   receiving, by a first mobile terminal, a status update message sent by a second mobile terminal, wherein the status update message is used to indicate a change of a status of the second mobile terminal;
   updating, by the first mobile terminal according to the status update message, status information of the second mobile terminal that is stored in the first mobile terminal;
   determining, by the first mobile terminal according to the status information of the second mobile terminal, a communication manner that is between the first mobile terminal and the second mobile terminal and supported by the first mobile terminal; and
   presenting, by the first mobile terminal, the communication manner.

2. The method according to claim 1, wherein before the receiving, by a first mobile terminal, a status update message sent by a second mobile terminal, the method further comprises:
   sending, by the first mobile terminal, a status request message to the second mobile terminal, wherein the status request message is used to request the change of the status of the second mobile terminal.

3. The method according to claim 2, wherein a format of the status request message is an SMS message format or a data packet format.

4. The method according to claim 2, wherein the status request message comprises an identifier of the first mobile terminal and an identifier of the second mobile terminal.

5. The method according to claim 2, wherein the status request message further comprises the status.

6. The method according to claim 5, wherein the status request message further comprises a last update time of the status, and the status update message is used to indicate a change of the status after the last update time.

7. The method according to claim 1, further comprising:
   presenting, by the first mobile terminal, the status information of the second mobile terminal, wherein the status information of the second mobile terminal comprises an identifier of a user of the second mobile terminal and the status of the second mobile terminal.

8. The method according to claim 1, wherein the determining, by the first mobile terminal according to the status information of the second mobile terminal, a communication manner that is between the first mobile terminal and the second mobile terminal and supported by the first mobile terminal comprises:
   determining, by the first mobile terminal according to status information of the first mobile terminal and the status information of the second mobile terminal, the communication manner that is between the first mobile terminal and the second mobile terminal and supported by the first mobile terminal.

9. The method according to claim 1, wherein the status comprises at least one of the following: a number, a terminal type, a battery status, an operating system, a network status, a package status, a current working mode, a current location, and weather of the current location.

10. The method according to claim 9, wherein when the status comprises the number, the status update message comprises a new number of the second mobile terminal and an old number of the second mobile terminal; and the updating, by the first mobile terminal according to the status update message, status information of the second mobile terminal that is stored in the first mobile terminal comprises:

replacing, by the first mobile terminal, the old number stored in the first mobile terminal with the new number.

11. The method according to claim 1, wherein a format of the status update message is an SMS message format or a data packet format.

12. A mobile terminal, comprising:

a memory; and a processor coupled to the memory and configured to:

receive a status update message sent by another mobile terminal, wherein the status update message is used to indicate a change of a status of the another mobile terminal; and update, according to the status update message, status information of the another mobile terminal that is stored in the mobile terminal;

determine, according to the status information of the another mobile terminal that was updated, a communication manner that is between the mobile terminal and the another mobile terminal and supported by the mobile terminal; and present the communication manner.

13. The mobile terminal according to claim 12, wherein the processor is further configured to send a status request message to the another mobile terminal, wherein the status request message is used to request the change of the status of the another mobile terminal.

14. The mobile terminal according to claim 13, wherein a format of the status request message is an SMS message format or a data packet format.

15. The mobile terminal according to claim 13, wherein the status request message comprises an identifier of the mobile terminal and an identifier of the another mobile terminal.

16. The mobile terminal according to claim 13, wherein the status request message further comprises the status.

17. The mobile terminal according to claim 16, wherein the status request message further comprises a last update time of the status, and the status update message is used to indicate a change of the status after the last update time.

18. The mobile terminal according to claim 12, wherein the processor is further configured to present the status information of the another mobile terminal, wherein the status information of the another mobile terminal comprises an identifier of a user of the another mobile terminal and the status of the another mobile terminal.

19. The mobile terminal according to claim 12, wherein the processor is further configured to:

determine, according to status information of the mobile terminal and the status information of the another mobile terminal that was updated, the communication manner that is between the mobile terminal and the another mobile terminal and supported by the mobile terminal.

20. The mobile terminal according to claim 12, wherein the status is selected from the group consisting of: a number, a terminal type, a battery status, an operating system, a network status, a package status, a current working mode, a current location, and weather of the current location.

21. The mobile terminal according to claim 20, wherein when the status comprises the number, the status update message comprises a new number of the another mobile terminal and an old number of the another mobile terminal; and the processor is further configured to replace the old number stored in the mobile terminal with the new number.

22. The mobile terminal according to claim 12, wherein a format of the status update message is an SMS message format or a data packet format.

* * * * *